(12) United States Patent
Anand et al.

(10) Patent No.: US 8,601,029 B2
(45) Date of Patent: Dec. 3, 2013

(54) DATA STEWARDSHIP IN FEDERATED MULTI-LEVEL MASTER DATA MANAGEMENT SYSTEMS

(75) Inventors: Rangachari Anand, Teaneck, NJ (US); Stacy F. Hobson, Poughkeepsie, NY (US); Juhnyoung Lee, Yorktown Heights, NY (US); Xuan Liu, Yorktown Heights, NY (US); Jeaha Yang, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 13/117,411

(22) Filed: May 27, 2011

(65) Prior Publication Data

US 2012/0303673 A1    Nov. 29, 2012

(51) Int. Cl.
*G06F 17/30* (2006.01)
(52) U.S. Cl.
USPC .......................................... 707/802; 707/805
(58) Field of Classification Search
USPC ................................ 707/802, 805
See application file for complete search history.

(56) References Cited

U.S. PATENT DOCUMENTS

| | | | |
|---|---|---|---|
| 5,550,971 A | 8/1996 | Brunner et al. | |
| 5,590,326 A | 12/1996 | Manabe | |
| 5,649,102 A | 7/1997 | Yamauchi et al. | |
| 5,872,850 A | 2/1999 | Klein et al. | |
| 6,064,968 A | 5/2000 | Schanz | |
| 6,256,676 B1 | 7/2001 | Taylor et al. | |
| 6,327,594 B1 | 12/2001 | Van Huben et al. | |
| 6,591,265 B1 | 7/2003 | Erickson et al. | |
| 6,738,975 B1 | 5/2004 | Yee et al. | |
| 6,779,184 B1 | 8/2004 | Puri | |
| 7,114,146 B2 | 9/2006 | Zhang et al. | |
| 7,131,057 B1 | 10/2006 | Ferrucci et al. | |
| 7,213,037 B2 | 5/2007 | Rangadass | |
| 7,237,225 B2 | 6/2007 | Kompalli et al. | |
| 7,293,010 B2 | 11/2007 | Angele et al. | |
| 7,305,392 B1 | 12/2007 | Abrams | |
| 7,509,326 B2 | 3/2009 | Krabel et al. | |
| 7,571,447 B2 | 8/2009 | Ally et al. | |
| 7,603,300 B2 | 10/2009 | Haffner et al. | |
| 7,617,174 B2 | 11/2009 | Chen et al. | |
| 7,620,647 B2 | 11/2009 | Stephens et al. | |
| 7,620,980 B1 | 11/2009 | Wood et al. | |
| 7,631,089 B2 | 12/2009 | Knauerhase et al. | |
| 7,725,429 B2 | 5/2010 | Rangadass et al. | |
| 7,895,445 B1 | 2/2011 | Albanese | |
| 8,195,698 B2 * | 6/2012 | Wasserman et al. | 707/793 |

(Continued)

OTHER PUBLICATIONS

Loser, et al., Master Data Management for Collaborative Service Processes, International Conference on Service Systems and Service Management, Beijing, China, 2004.

(Continued)

*Primary Examiner* — Kim Nguyen
(74) *Attorney, Agent, or Firm* — Scully, Scott, Murphy & Presser, P.C.; William Stock, Esq.

(57) ABSTRACT

Managing data stewardship in multi-level MDM systems may include a steward data composer that creates data steward repository for a master data management system to define relationships between data stewards and data objects for which data stewards are responsible and steward data consolidator that creates an integrated data steward repository by combining multiple data steward repositories.

16 Claims, 11 Drawing Sheets

(56) References Cited

U.S. PATENT DOCUMENTS

| | | | |
|---|---|---|---|
| 8,411,689 B2* | 4/2013 | Koch et al. | 370/400 |
| 2003/0004774 A1* | 1/2003 | Greene et al. | 705/8 |
| 2003/0137539 A1 | 7/2003 | Dees | |
| 2004/0103103 A1 | 5/2004 | Kalthoff et al. | |
| 2005/0055556 A1 | 3/2005 | Shiu et al. | |
| 2005/0240621 A1* | 10/2005 | Robertson et al. | 707/102 |
| 2006/0101096 A1 | 5/2006 | Fuerst | |
| 2006/0259923 A1 | 11/2006 | Chiu | |
| 2006/0287890 A1 | 12/2006 | Stead | |
| 2007/0220035 A1 | 9/2007 | Misovski | |
| 2007/0220588 A1 | 9/2007 | Panda et al. | |
| 2007/0239858 A1 | 10/2007 | Banerji et al. | |
| 2007/0282748 A1 | 12/2007 | Saint Clair | |
| 2008/0052310 A1 | 2/2008 | Rangadass | |
| 2008/0059543 A1 | 3/2008 | Engel | |
| 2008/0256467 A1 | 10/2008 | Chu | |
| 2009/0099852 A1 | 4/2009 | Ouimet | |
| 2010/0030623 A1 | 2/2010 | Guglani | |
| 2010/0042641 A1 | 2/2010 | Kamalakantha et al. | |
| 2010/0088334 A1* | 4/2010 | Wasserman et al. | 707/769 |
| 2010/0122155 A1 | 5/2010 | Monsarrat | |
| 2010/0142467 A1* | 6/2010 | Tiirola et al. | 370/329 |
| 2010/0218167 A1 | 8/2010 | Turner et al. | |
| 2011/0010759 A1 | 1/2011 | Adler | |
| 2011/0025707 A1 | 2/2011 | Fujioka | |
| 2011/0047597 A1 | 2/2011 | Mahaffey | |
| 2011/0069712 A1* | 3/2011 | Koch et al. | 370/400 |
| 2011/0078243 A1 | 3/2011 | Carpenter | |
| 2011/0213859 A1* | 9/2011 | Greene et al. | 709/218 |

OTHER PUBLICATIONS

Ullman, Information integration using logical views, Theoretical Computer Science—Special issue on the 6th International Conf. on DB Theory—ICDT, vol. 239 Is. 2, May 2000.

Genesereth, et al., Infomaster: an information integration system, SIGMOD '97 Proceedings of the 1997 ACM SIGMOD international conference on Management of data, 1997.

Arens, et al., Query reformulation for dynamic information integration, Journal of Intelligent Information Systems, vol. 6 Issue 2-3, Jun. 1996.

Themistocleous, et al., ERP and application integration: Exploratory survey, AMCIS 2001 proceedings.

Lee, et al., Enterprise integration with ERP and EAI, Communications of the ACM, vol. 46 Issue 2, Feb. 2003.

Zeng, et al., QoS-aware middleware for Web services composition, IEEE Transactions on Software Engineering, vol. 30, Issue 5, May 2004.

Zeng, Quality driven web services composition, WWW '03 Proceedings of the 12th international conference on World Wide Web, 2003.

Milanovic, Current Solutions for Web Service Composition, IEEE Internet Computing, vol. 8, Issue 6, Nov. 2004.

Benatallah, et al., The Self-Serv environment for Web services composition, IEEE Internet Computing, vol. 7, Issue 1, Jan./Feb. 2003.

Casati, et al., Adaptive and Dynamic Service Composition in eFlow, CAiSE '00 Proceedings of the 12th International Conf. on Advanced Information Systems Engineering, 2000.

Gold, et al., Understanding Service-Oriented Software, IEEE Software, vol. 21 Issue 2, Mar. 2004.

Drummond, et al., A Data Broker for Distributed Computing Environments, ICCS '01 Proceedings of the International Conference on Computational Sciences—Part 1, 2001.

Modahl, et al., MediaBroker: An Architecture for Pervasive Computing, PERCOM '04 Proceedings of the 2nd IEEE Intntnl Conf. on Pervasive Computing and Communications, 2004.

Mouhib Alnoukari, Applying Adaptive Software Development (ASD) Agile Modeling on Predictive Data Mining Applications: ASD DM Methodology, Int. Symposium on Info. Tech. 2008.

Cervantes, et al, A Framework for Constructing Adaptive Cornponent-Based Applications: Concepts and Experiences. 7th Symposium on Computer-Based Software Engineering, 2004.

Gui, et al, An Architectural Based Framework for Managing Adaptive Real-time Applications, 35th Euromicro Conference on Software Engineering and Advanced Applications, 2009.

Mena, et al, A Software Retrieval Service Based on Adaptive Knowledge-Driven Agents for Wireless Environments, ACM Transactions on Autonomous & Adaptive Systems, V.1 I.1 2006.

Jeff Kelly, New Online Marketplace Could Boost Data Integration Applications, DataManagement.com, Feb. 18, 200. http://searchdatamanagement.techtarget.com/news/1389686.

Turner, Turning Software into a Service, Computer, vol. 36, Issue 10, Oct. 2003.

Deep Secure, The Deep-Secure Mail Guard Applies Policy Enforcement and Content Checking to Email, Deep Secure Mail Guard Information and Fact Sheet, 2010.

Anca Andreescu et al., "Combining Actual Trends in Software Systems for Business Management," Internation Conference on Computer Systems and Technologies, Jun. 12-13, 2008.

Allen Drelbelbis et al., "Enterprise Master Data Management, An SOA Approach to Managing Core Information," IBM Press, Pearson plc, Upper Saddle River, NJ.

Jean-Sebastier Brunner et al., Explorations in the Use of Semantic Web Technologies for Product Information Management, May 8-12, 2007, Banff, Alberta, Canada.

Michael Franklin et al., "From Databases to Dataspaces: A New Abstraction for Information Management," Sigmod Record, 34(4):27-33, 2005.

* cited by examiner

DATA STEWARDSHIP IN FEDERATED MULTI-LEVEL MASTER DATA MANAGEMENT SYSTEMS

FIELD

The present application relates generally to computers and applications, and more particularly to master data management systems and data stewardship in federated multiple level master data management systems, for instance, in a multi-level fashion.

BACKGROUND

Master data refers to facts that describe the core of entities, for example, an organization's employees, customers, suppliers, partners, organizations, products, materials, accounts, medical records, locations, and others. Such master data are of high value information that an organization uses repeatedly across many business processes. *Enterprise Master Data Management* by Allen Dreibelbis, Eberhard Hechler, Ivan Milman, Martin Oberhofer, Paul van Run and Dan Wolfson, IBM Press, 2008 provide background on master data management.

Managing master data faces challenges in that the data is usually scattered throughout the enterprise without consistent view of the master data. Fragmentation occurs as a result of the data being trapped inside enterprise resource planning (ERP), customer relationship management (CRM) and other commercially available off-the-shelf (COTS) packages. Factors such as mergers and acquisitions, experiments in new markets, decentralized businesses, and legal requirements across geographical boundaries also may contribute to fragmentation and inconsistency in master data.

Master data may be managed as objects and attributes, and by defining transactions over and access control to the objects and attributes. Data governance procedures may be also defined for functionalities such as conflict resolution, data import and data integration. An MDM system or server should ensure consistent master information across transactional and analytical systems, address key issues such as data quality and consistency proactively rather than "after the fact" in the data warehouse, decouple master information from individual applications, become a central, application independent resource, and simplify ongoing integration tasks and new app development. An MDM system can be implemented with different styles. For instance, in "consolidation" implementation style, data is periodically replicated to the MDM server. In "registry" implementation style, an MDM server knows where to find the data. In "transactional hub" implementation style, an MDM server becomes the system of record for master data. Applications should be appropriately architected to use this style of MDM implementation.

InfoSphere™ MDM is an MDM product from International Business Corporation (IBM), Armonk, N.Y. InfoSphere™ MDM product family includes Master Data Management Server with data model that include three domains (party, product, account), Master Information Hub that allows a user to make user's own domain and data models, and Master Data Manager for Product Information Management, which is a web-based collaborative authoring environment for a product domain in a data model. The party domain of the MDM Server manages the entirety of data related to parties such as customers, vendors, and suppliers, people and organization. The product domain of the MDM Server manages the definitions of products, category hierarchies, bundles, and equivalences. Its collection of products makes up a product catalog that is accessible throughout the enterprise. The account domain of the MDM Server manages business relationships and agreements with other parties, such as billing, claims and contracts. MDM functionalities include suspecting duplicate processing (also referred to as "data stewardship") that prevents inadvertent creation of duplicate parties and products, for instance, using matching techniques; managing history of data modifications (also referred to as "point-in-time history"), which includes a full audit database that contains the full modification histories of all data objects and a set of query options for the audit database; keeping track of the source of all data and when it was added (also referred to as "source value"); maintain links to documents stored in a Content Management System (CMS) (also referred to as "document attachments"); and allowing administrators to define what elements and sub-elements users and user groups can see based on defined constraints (also referred to as "rules of visibility"). Data stewardship functionalities in IBM InfoSphere MDM server include managing suspect duplicate processing, managing data hierarchies and managing metadata definition.

To date, conventional use of master data management includes managing a single physical and logical MDM system for an entire enterprise, in which the scope of the applications and organizations of MDM is determined in the design stage. The current use of the data stewardship mainly focuses on single MDM or data warehouse. Data steward repository in an MDM holds steward data, which defines relationships between data stewards and data objects, and MDM systems provide user interface (UI) to support data stewardship functionalities.

BRIEF SUMMARY

Managing data stewardship in a multi-level master data management system may be provided. A system for managing data stewardship in a multi-level master data management system, in one aspect, may include steward data composer including at least: steward data creator operable to create data steward repository for a master data management system to define relationships between data stewards and data objects for which data stewards are responsible; steward data consolidator operable to create an integrated data steward repository by combining multiple data steward repositories; and steward data conflict resolver operable to support override of data steward relationships. Data stewardship facilitator component may include at least: data steward locator operable to determine from the data steward repository the data steward responsible for a data object; data update notification module operable to notify the determined data steward of a pending data update; and data update handler operable to support data steward to approve or reject the data update.

A method of managing data stewardship in multi-level master data management system, the multi-level master data management system including a plurality of participant master data management nodes and a group master data management node that manages the plurality of participant master data management nodes, in one aspect, may include creating a data steward repository for each of the participant master data management nodes to define relationships between data stewards and data objects for which data stewards are responsible. The method may also include determining a data access link type between each of the participant master data management nodes and the group master data management node. The method may further include integrating data steward information of a participant master data management node of the plurality of participant master data management nodes to a data steward repository of the group master data management node, in response to determining that data access link type between the participant master data management node and the group master data management node is a reference link. The method may also include, in response to determining that a data access link type between the participant master data management node and the group master data management node is an operational link, performing a conflict check and resolution for existing conflict before integrating data steward information of the participant master data management node to the group master data management node.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
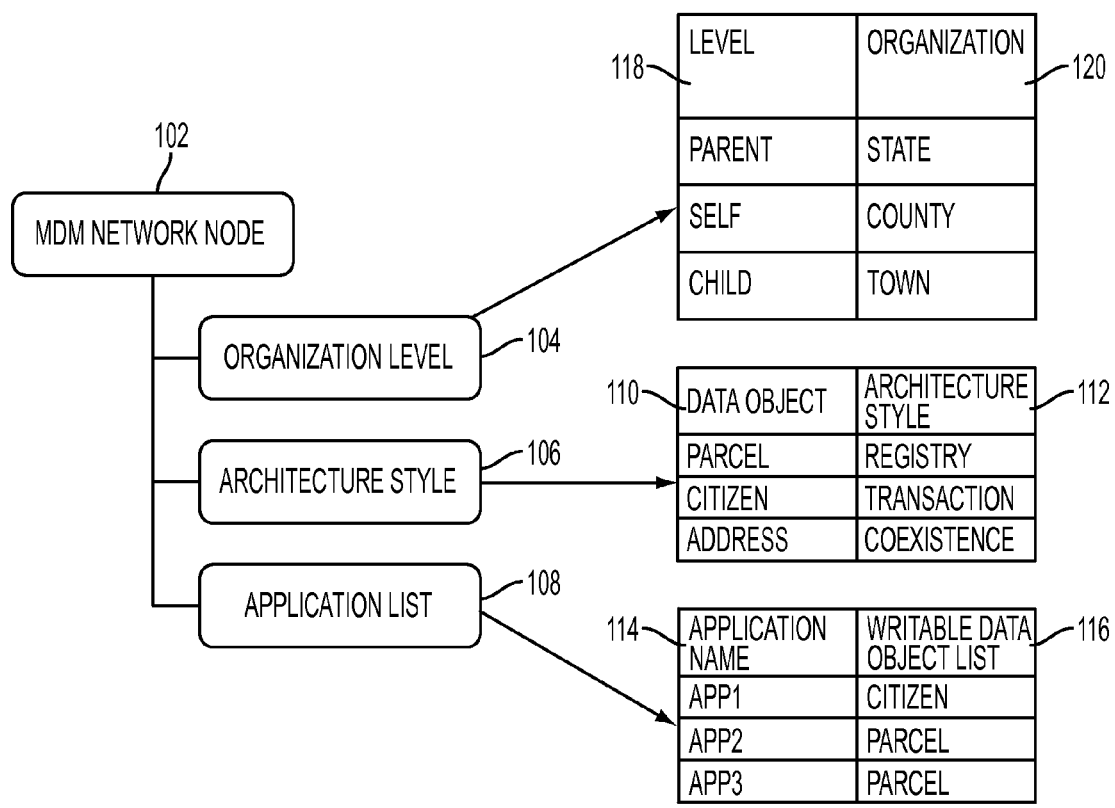
FIG. 1 illustrates an MDM network model in one embodiment of the present disclosure.

The present disclosure in one aspect provides for data stewardship in federation of multi-level master data management (MDM) systems, for instance, in organizations where there may be requirements for multiple and multiple-level (hierarchical) physical MDM systems. In one aspect of the present disclosure, a single logical MDM view is provided for the multiple and multiple-level physical MDM systems. The MDM systems may be established in the bottom-up manner, and the MDM functionalities may be ensured in this federated MDM environment.

The systems and/or methodologies of the present disclosure allows for adding, modifying, and/or removing an MDM, as needed or desired, in a platform (or network) containing a plurality of MDM systems, and federate it with the existing MDM systems to maintain a single logical MDM view in the platform. An example platform is a government data platform, for instance, operating on a municipal service cloud. In one aspect, the systems and/or methodologies of the present disclosure allows for defining the scope of the applications and organizations represented by the new MDM in view of existing MDM systems in the platform; leveraging (using) the existing MDM systems, which may be implemented in a different architectural style, to design and implement the new MDM system more efficiently; federating different (e.g., existing and new) MDM systems to make them work together and consolidate and share master data among different level of organizations and applications; handling different types of MDM addition, e.g., MDM system and a group MDM systems. At the same time, the systems and/or methodologies of the present disclosure may ensure MDM functionality (e.g., data stewardship, point-in-time-history, source value, document attachments, rules of visibility) to be performed properly in the federated MDM environment.

In one aspect, a methodology of the present disclosure may establish one or more links between new coming MDM system with existing MDM systems to make them work together and leverage each other's data. The methodology of the present disclosure in another aspect may manage the topology of MDM network and coordinate the MDM systems (also referred to as nodes) and links between them. Yet in another aspect, the methodology of the present disclosure may control the data flow in MDM network, while keeping with the MDM functionality such as data stewardship (suspect duplicate processing), point-in-time history, source value tracking, document attachments, and rules of visibility.

MDM functionality at the group level may include one or more of the following: suspect duplicate processing ("data stewardship"), including managing "data stewardship" information repository in each MDM node, creating "data stewardship" repository for a group MDM node by leveraging "data stewardship" from the MDMs in the group, and performing "data stewardship" functionalities according to the data stewardship repository; point-in-time history functionality, for example, including a full audit database that contains the full modification histories of all data objects (e.g., from which MDM nodes); source value functionality, for example, including keeping track of the source of all data (e.g., specifying which MDM nodes have or own which data) and when the data was added; document attachments functionality, for example, including aliasing of MDM node links to documents stored in a content management system (CMS); rules of visibility functionality, for example, including creating "rules of visibility" based on "rules of visibility" from MDM nodes, setting up a group level rules by which other MDM nodes may see which parts of the master data, allowing to override "rules of visibility" from the MDM nodes; and defining "rules of visibility" for other groups.

FIG. 1 illustrates an MDM network model in one embodiment of the present disclosure. The MDM network model represents an autonomous MDM system (also referred to as a node, or an MDM network node). An MDM network node 102 may be structured into different components: organization level 104, architecture style 106, and application list 108. Other structural definitions are possible. The organization level 104 may specify the levels 108 (e.g., parent, self, child) and names of the levels (e.g., state, county, town). The MDM network node 102 manages data objects 110, which may be implemented with three possible MDM "architecture styles" as shown at 112. The MDM network node 102 also manages applications that access the data objects 110, for instance, via an application list 108. The application list 108 may include the names of the applications 114 and one or more objects those applications write to as shown at 116.

A link may be established between two autonomous MDM systems, for instance, between a server or application of one MDM system to another MDM system's server or application. A link is established, for example, by allowing an MDM to access another MDM's data. The model shown in FIG. 1 may be used to identify the architecture of a new MDM node and links that should be established between the new node and one or more existing nodes in order to leverage them. The model may be also used to define the scope of the applications and organizations involved in the new MDM.

The present disclosure in one aspect provides for multi-level MDM system, for example, with established hierarchy with group MDM nodes and root MDM nodes to support multiple-level federated MDM systems. The methodology of the present disclosure may ensure MDM functionality in this federated multi-level MDM environment and provide a single logical MDM view in the system. In one embodiment of the present disclosure, a group MDM node ("Group MDM node") is provided as a central MDM node assigned to manage MDM nodes for a group and to ensure the MDM functionality at the group level and provide a single logical MDM view for the group. A group may comprise MDM nodes that have the same parent node. A root MDM node ("Root MDM node") may be provided as a central system assigned to manage all group MDMs for the entire system. All group MDM nodes directly link with the root MDM node via a network connection. The root MDM node may construct group MDM nodes to provide a single logical hierarchical view of all MDM nodes based on organization information. The root MDM node also may the MDM functionality in this federated MDM in the eco-system to provide a single logical MDM view in the eco-system.

MDM functionality at the root level may include one or more of the following: suspect duplicate processing ("data stewardship"), including creating "data stewardship" repository for a root MDM node based on "data stewardship" from the group MDM nodes, and performing "data stewardship" functionalities according to the data stewardship repository; point-in-time history functionality, for example, including a full audit database that contains the full modification histories of all data objects (e.g., from which group MDM nodes); source value functionality, for example, including keeping track of the source of all data (e.g., specifying which group MDM nodes have or own which data) and when the data was added; document attachments functionality, for example, including aliasing of group MDM node links to documents stored in a content management system (CMS); rules of visibility functionality, for example, including creating "rules of visibility" based on "rules of visibility" from group MDM nodes, setting up a root level rules by which other group MDM nodes may see which parts of the master data, allowing to override "rules of visibility" from the group MDM nodes. Federation of MDM systems is described in co-owned patent applications entitled, "Federation of Master Data Management Systems" Ser. No. 13/117,321 and "Federation of Multi-level Master Data Management Systems" Ser. No. 13/117,370, incorporated herein by reference in their entirety.

Data stewardship refers to the process of ensuring data integrity—data quality, accessibility, and reusability. Data steward is a person who is responsible for the above process. General functionalities of data stewardship may include approving business naming standards, developing consistent data definitions, determining data aliases, developing standards, documenting the business rules of the corporation, monitoring the data quality, defining security requirements, and accepting and rejecting data updates.

The present disclosure in one embodiment provides a methodology to manage data steward repository in a multi-level MDM system. A data steward repository for each MDM may define relationships between data stewards and data objects. A data steward data tool may generate the data steward repository for group MDM nodes. A data steward data tool may generate the data steward repository for a root MDM node.

The present disclosure in one embodiment also provides a methodology to perform the data stewardship functionalities in a multi-level MDM system. Each MDM node uses the data stewardship functionalities provided by the single MDM (e.g., IBM InfoSphere MDM server provides stewardship user interface (UI) software). The group MDM routes the request to the right data steward to perform the data stewardship functionalities. The root MDM routes the request to the right data steward to perform the data stewardship functionalities.

Figure 2:
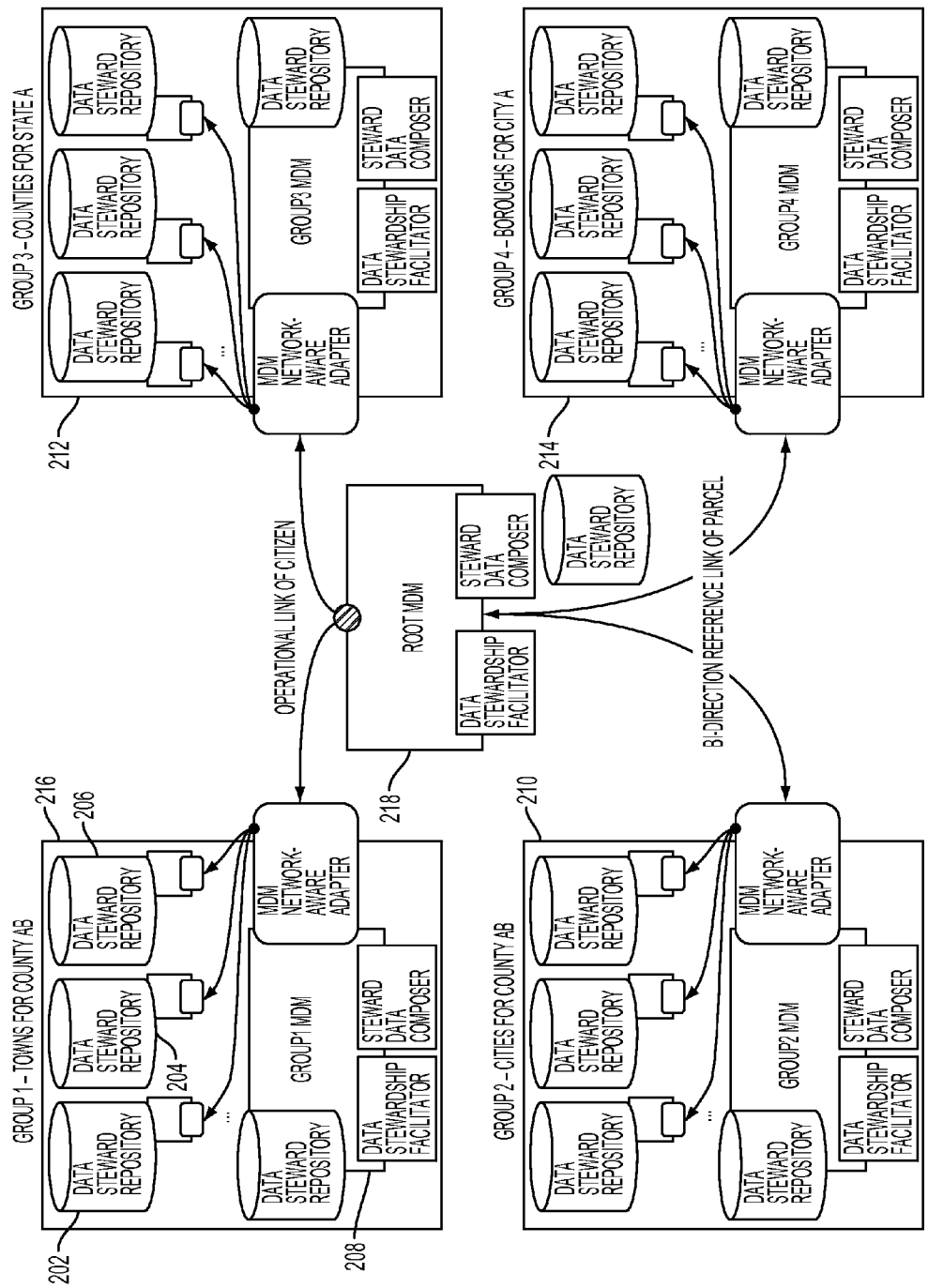
FIG. 2 is a system diagram illustrating data stewardship in a MDM network.

FIG. 2 is a system diagram illustrating data stewardship in a MDM network. A group MDM node may manage the federation of individual MDM nodes that are grouped based on their common characteristics and interest. There may be multiple of these group MDM nodes. For example, the local municipal governments in the town A, town B and town C may have common characteristics such as serving their citizen under the same county government policy and provide similar services to their citizens. These municipal governments also might like to share their ideas and data to maximize efficiencies and to provide better services to their citizens. The "Group MDM node" enables this group of local municipal governments to share master data among themselves and represents this group's master data in a higher level organization hierarchy. The MDM nodes organized in a hierarchical fashion with respect to their group node.

For example, MDM nodes 202, 204, 206 represent entities in one hierarchical level in an organization; a group node 208 is assigned to manage the MDM nodes 202, 204 and 206 and act as a central manager to those nodes, and among other things provides and synchronizes data stewardship functionalities among the MDM nodes 202, 204 and 206. For instance, in a government organization, the MDM nodes 202, 204 and 206 may represent MDM systems of three different towns in the same county. The MDM node 202 may provide the master data service for town A's applications; the MDM node 204 may provide the master data service for town B's applications; the MDM node 206 may provide the master data service for town C's applications. Other MDM nodes may be grouped similarly, for example, as shown at 210, 212, 214. A root MDM node 218 manages and provides synchronized data stewardship functionalities among the groups 210, 212, 214 and 216.

In the example shown, MDMs nodes (210 and 214) are implemented in registry style and manages "parcel" data object. A bi-direction reference link for "parcel" data object may be established between a registry style group MDM node (210) and another node. Similarly, a bi-direction reference link for "parcel" may be established between a registry style group MDM node (214) and another node. An operational link for "citizen" data object may be established between a system that is of record for "citizen" data object and another transaction or coexistence style MDM node. Bi-direction reference link refers to a link in between two nodes in both directions. For example, the root MDM node 218 has a reference link to the group MDM node at 210, and the group MDM node 210 also has a reference link to the root MDM node 218, meaning that each node may reference the other's data by reference.

As described above, data objects may be architected or implemented in different architectural style. Depending on the architectural style, different links may be established. For instance, if a data object of a node is implemented as "registry" style, that node accesses data by a reference link from another node (which may be implemented in any of the shown styles, e.g., registry, transaction or co-existence). As another example, if a data object of a node is implemented as "transaction hub" style (also shortened and referred to as "transaction" style), another node (which may be implemented in transaction or co-existence style) may access the data by operation link (which may be implemented in transaction or co-existence style).

In a traditional MDM system, a transaction style MDM system has all the data objects stored locally with an MDM server of the system, and when an application submits a read or write request to the MDM system, the MDM server manages the transaction. In a usage scenario (MDM network) of the present disclosure in one embodiment, a transaction style MDM system does not own all the data locally, e.g., some data may be distributed among other MDM systems. Thus, when an application submits a read or write request to the MDM system and if servicing this request includes accessing data from other MDM systems in the network, the MDM system (which initially received the request) performs a distributed query to the other MDM systems and manages the distributed transaction. In one embodiment of the present disclosure, an operational link is established or exists between MDM nodes if the source MDM node of the link is implemented as a transaction style MDM system and manages the distributed transaction between the source node and the target node of the link.

In one embodiment of the present disclosure, an MDM system or node may be implemented in different architectural styles. For example, if an MDM system manages different data object types, the system could be implemented in different architectural styles according to the different data types.

Briefly, in "consolidation" implementation style of an MDM system, an individual application linked to the MDM system stores its own data, for instance, in its own database. The data is periodically replicated to the MDM server from each application's data. Thus, in this style, MDM server uses its own local copy of the data for operations.

The consolidation implementation style focuses on bringing together data from multiple sources for purposes of a central reference or reporting analysis. This can be compared to a typical data warehouse. The data collected is not used to update other systems. The system of record of the data belongs to the individual source systems. The consolidation implementation style brings together master data from a variety of existing systems, both database and application systems, into a single managed MDM hub. Along the way, the data is transformed, cleansed, matched, and integrated in order to provide a complete "golden" record for one or more master data domains. This golden record serves as a trusted source to downstream systems for reporting and analytics, or as a system of reference to other operational applications. Changes to the data primarily come in from the systems that feed it; this is a read-only system. The basic consolidation style has reads and writes going directly against the existing systems and the MDM system receiving updates from these existing systems. The integrated and cleansed information is then distributed to downstream systems (such as data warehouses) that use, but do not update, the master data.

In "registry" implementation style of an MDM system, an individual application linked to the MDM system stores its own data, for instance, in its own database. The MDM system accesses the data in the individual application's database, by reference, and does not operate on a local copy. For example, the MDM system may store references to the data physically stored in the individual application's database. Virtual consolidated view is assembled dynamically and is often read-only. Authoring remains distributed.

The registry style creates a skeleton record with minimum amount of data required to identify the master record and to facilitate the linking of accounts across multiple source systems. The data collected is not used to update other systems. The system of record of the data belongs to the individual source systems. The registry implementation style can be useful for providing a read-only source of master data as a reference to downstream systems with a minimum of data redundancy. The outside systems are existing sources of master data. The MDM system holds the minimum amount of information required to uniquely identify a master data record; it also provides cross-references to detailed information that is managed within other systems and databases. The registry style implementation is able to clean and match this identifying information and assumes that the source systems are able to adequately manage the quality of their own data. A registry style of MDM implementation serves as a read-only system of reference to other applications. Queries against the registry style MDM system dynamically assemble the required information in two steps. First, the identifying information is looked up within the MDM system. Then, using that identity and the cross-reference information, relevant pieces of information are retrieved from other source systems.

In "coexistence" implementation style of an MDM system, the MDM system physically stores consolidated view of master data. The coexistence style implements all the features of the registry style, and also provides data elements that the client wants to track at the party level. Master data can be updated in source systems or in MDM Server, in which case the data is fed back to source systems. IBM® InfoSphere™ Rapid Deployment Package (RDP) for Master Data Management (MDM) facilitates the process of feeding an MDM server with master data from source systems in batch fashion. The coexistence style may be considered as being one step closer than the Registry style to becoming the system of record, but the existing source systems still remain as the system of record.

The coexistence style of MDM implementation involves master data that may be authored and stored in numerous locations and that includes a physically instantiated golden record in the MDM system that is synchronized with source systems. The golden record may be constructed in the same manner as the consolidation style, e.g., through batch imports, and can be both queried and updated within the MDM system. Updates to the master data can be fed back to source systems as well as published to downstream systems. In a coexistence style, the MDM system can interact with other applications or users.

An MDM system implemented in the coexistence style is not a system of record, because it is not the single place where master data is authored and updated. It is a participant in a loosely distributed environment that can serve as an authoritative source of master data to other applications and systems. Because the master data is physically instantiated within the MDM system, the quality of the data can be managed as the data is imported into the MDM system.

The transaction hub style implements centralized management of master data. All data updates happen directly in the MDM system and can be distributed to other applications and MDM systems in MDM network, which implement read-only access. The MDM repository becomes the system of record for master data. The transactional hub implementation style provides a centralized, complete set of master data for one or more domains. It is a system of record, serving as the single version of the master data it manages. A transactional hub is part of the operational fabric of an information technology (IT) environment, receiving and responding to requests in a timely manner. This style often evolves from the consolidation and coexistence implementations. The fundamental difference is the change from a system of reference to a system of record. As a system of record, updates to master data happen directly to this system using the services provided by the hub that is the MDM system. As update transactions take place, the master data is cleansed, matched, and augmented in order to maintain the quality of the master data. After updates are accepted, the system distributes these changes to interested applications and users. Changes can be distributed as they happen via messaging, or the changes can be aggregated and distributed as a batch.

Each of the group MDM nodes and root MDM node in a multi-level MDM management system may include its own data stewardship facilitator and steward data composer and data steward repository. For instance, the root MDM node 218 may include data stewardship facilitator functionality 220 and steward data compose functionality 222. Those functionalities may be implemented as a computer module operable to execute on a processor or the like. The root MDM node 218 may also include its own data steward repository 224. Similarly, the group MDM nodes 210, 212, 214, 216 may each have their own data stewardship facilitator, steward data composer and data steward repository.

Figure 3:
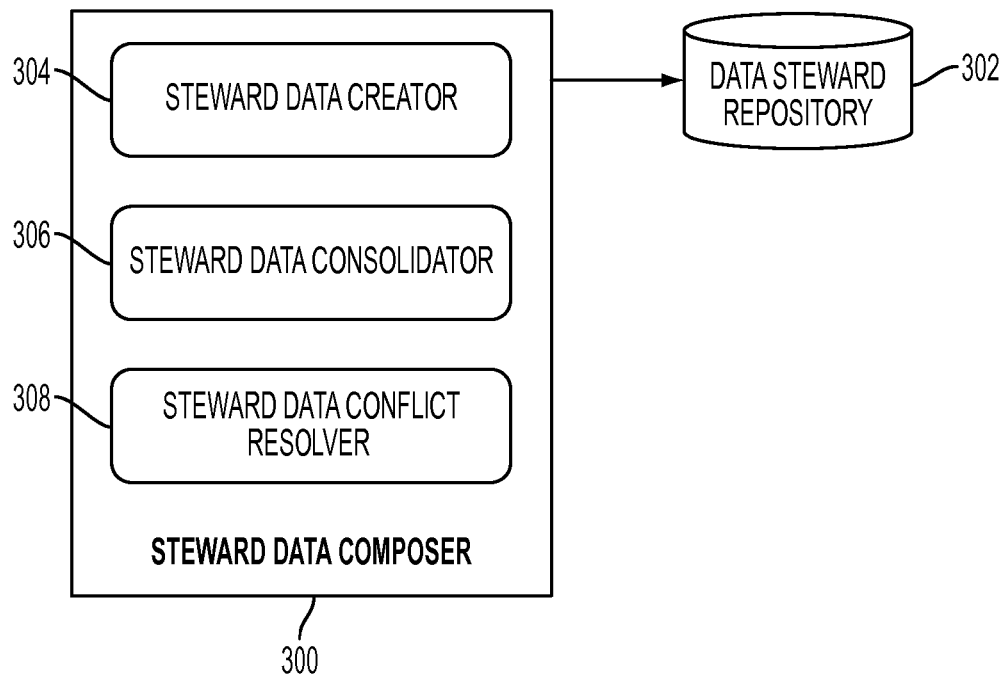
FIG. 3 illustrates components of data steward data composer in one embodiment of the present disclosure.

FIG. 3 illustrates components of data steward data composer 300 in one embodiment of the present disclosure. A data stewardship repository 302 stores information defining the relationships between data stewards and data objects they steward. For instance, names of data steward may be stored or indexed with the data objects the data steward manages. A steward data creator 304 creates data steward repository for each MDM node. A data stewardship repository records the data steward (e.g., a person or an administrator or the like accountable) for each data object. Steward data composer 300 manages (creates and updates) data steward repository, e.g., of individual MDM nodes, group MDM nodes, and a root MDM node. A steward data consolidator 306 creates an integrated data steward repository by combining multiple data steward repositories.

A steward data conflict resolver 308 supports manual override of data steward relationship, for example, by allowing overwriting of the relationship defined in the repository 302.

Figure 4:
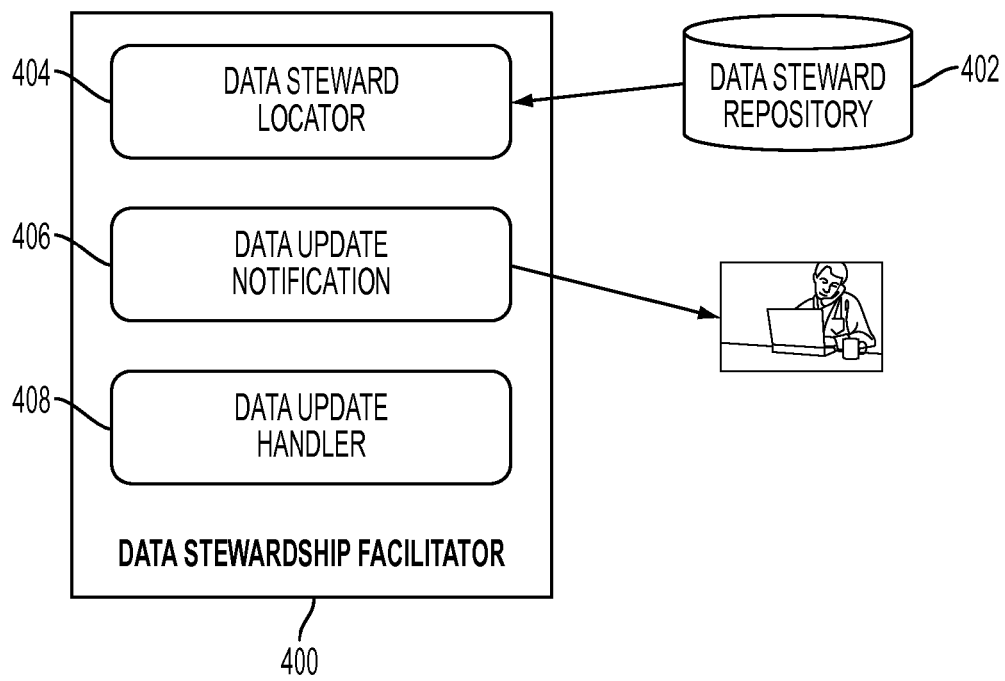
FIG. 4 illustrates components of data steward facilitator in one embodiment of the present disclosure.

FIG. 4 illustrates components of data steward facilitator 400 in one embodiment of the present disclosure. A data steward locator 404 may retrieve the data steward repository 402 to locate the right steward, i.e., the data steward responsible for the data object, e.g., by searching the data steward repository. Data update notification functionality 406 may notify the proper data steward 408 for the pending data update. Data update handler functionality 408 may support the data steward to approve or reject the data update. For example, the update handler may include a tool and/or a user interface component or software to allow the data steward to accept or deny the data update.

Figure 5:
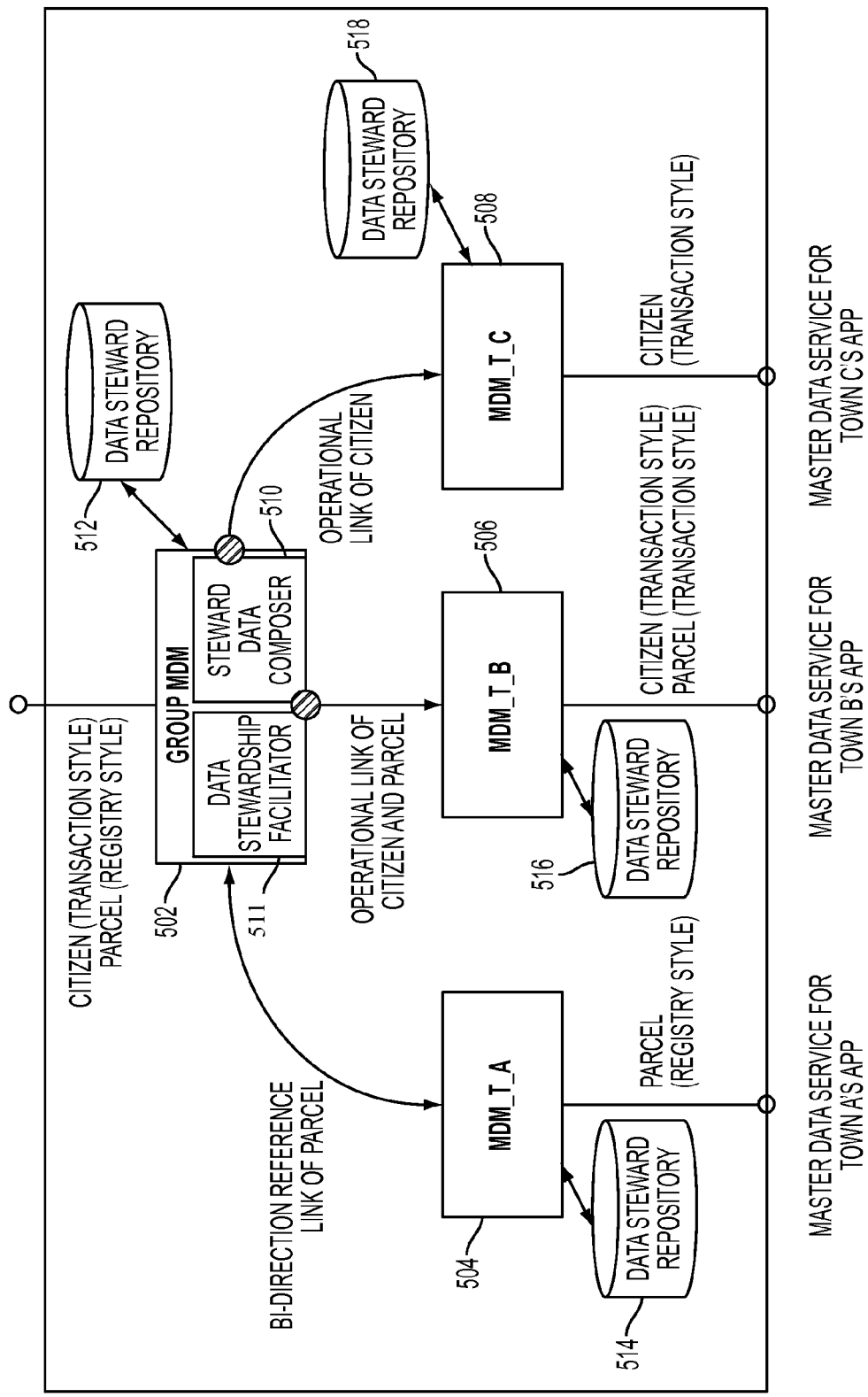
FIG. 5 is an architectural diagram illustrating workings of data stewardship in a group of MDMs managed by a group MDM node in one embodiment of the present disclosure.

FIG. 5 is an architectural diagram illustrating workings of data stewardship in a group of MDMs managed by a group MDM node in one embodiment of the present disclosure. In one embodiment of the present disclosure, each MDM node (e.g., 502, 504, 506, 508) manages its own data steward repository (e.g., 512, 514, 516, 518, respectively). A data stewardship repository (e.g., 512, 514, 516, 518) records the data steward (person accountable or the like) for each data object. Steward data composer 510 manages (creates and updates) data steward repository for group MDM (502). Data stewardship facilitator 511 routes the data updates to the right data steward for approval. A data steward in another aspect may be an automated machine or module that acts as an entity responsible for the data, and performs the functionalities of data stewardship, which a human data steward may perform.

Figure 6:
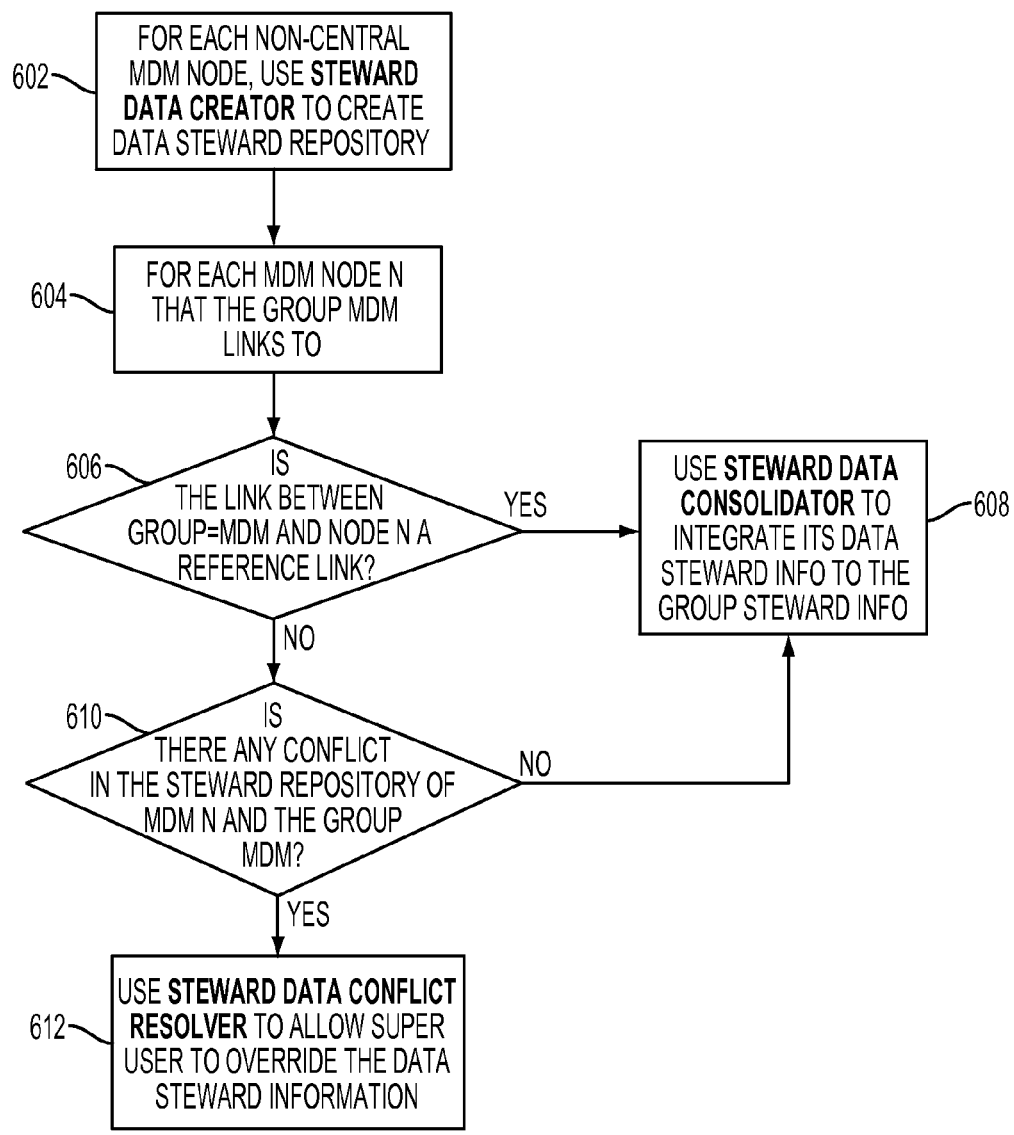
FIG. 6 is a flow diagram illustrating a method of creating a data steward repository in one embodiment of the present disclosure.

FIG. 6 is a flow diagram illustrating a method of creating a data steward repository in one embodiment of the present disclosure. The method may be used to create a data steward repository for a group MDM node or a root MDM node. At 602, for each non-central MDM node (i.e., a MDM node that is not a root MDM node), steward data creator is used to create data steward repository. At 604, for each MDM node N that the group MDM links to, it is determined at 606 whether the link between a group MDM node and a MDM node N is a reference link. A reference link indicates that a node is implemented in registry style.

At 608, if the link is a reference link, steward data consolidator is used to integrate its data steward information to the group steward information. At 610, if the link is not a reference link, it is determined whether there are any conflict in the steward repository of MDM n and the group MDM. Conflicts may exist if two MDM nodes' repositories indicate two different data stewards to be responsible for the same data. For instance, in the example shown in FIG. 7, the link between Group MDM node 702 and MDM_T_B 706 is operational. A conflict check discloses that the data steward for "Citizen" at the Group MDM node 702 level is "Dan", but the data steward for "Citizen" at the MDM_T_B node 706 level is "Ben". In this example, the conflict may be resolved by setting the data steward to be "Dan". If there are no conflicts, the logic of the method proceeds to 608. At 612, if it is determined that there are conflicts, a steward data conflict resolver may be used to allow a super user to override the data steward information.

Figure 7:
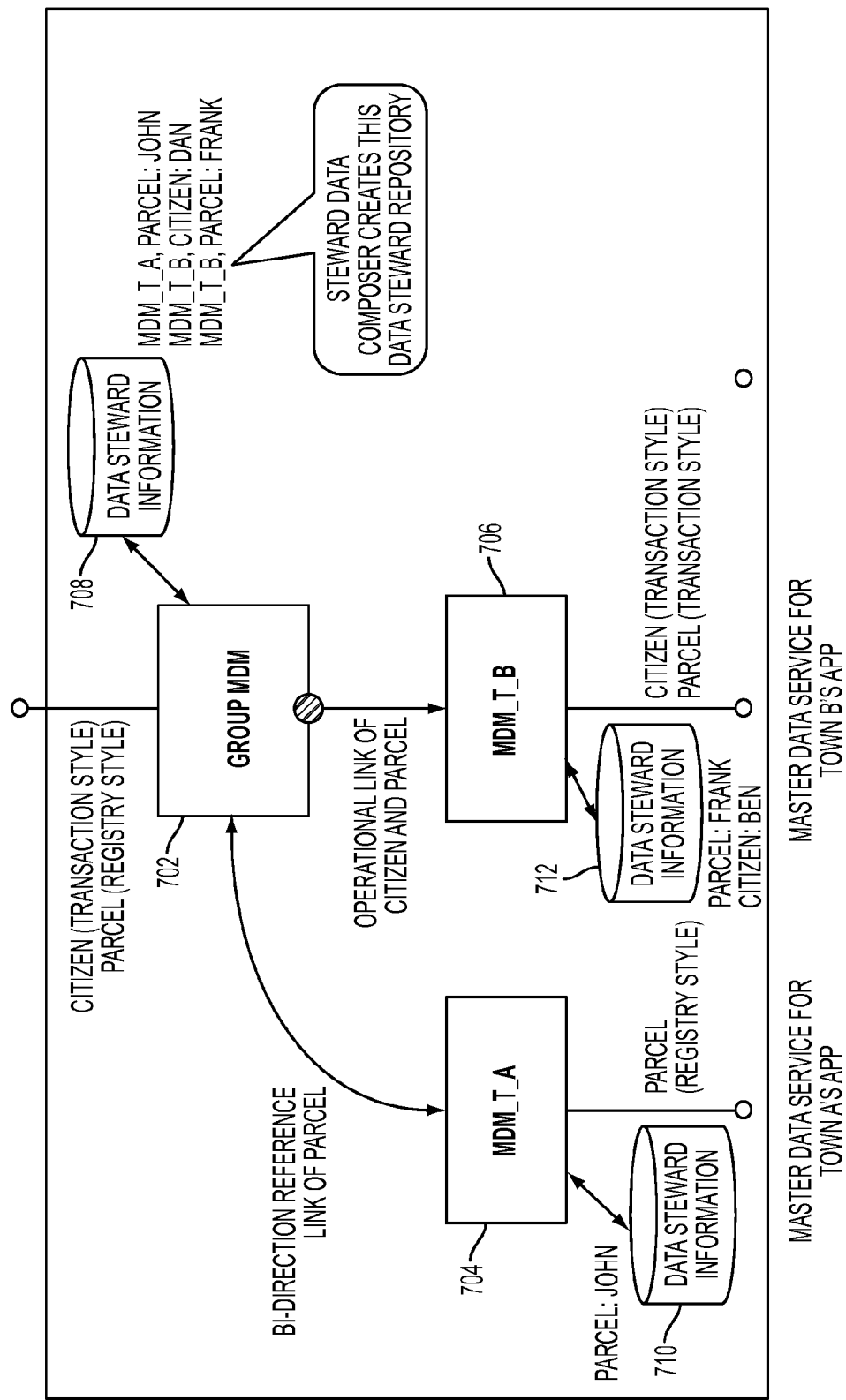
FIG. 7 is a system diagram illustrating components that create a data steward repository in one embodiment of the present disclosure.

FIG. 7 is a system diagram illustrating components that create a data steward repository in one embodiment of the present disclosure. In this example, the data steward repository for MDM_T_A node (704) may store the relationship, "Parcel: John", indicating that "John" is the data steward for data object "Parcel". The data steward repository for MDM_T_B node (706) contains "Parcel: Frank, Citizen: Ben". For each of the two MDM nodes (704, 706), check is performed to determine if the link between it and the group MDM node (702) is a reference link (606). In the case of MDM_T_A node 704, the link is determined to be a reference link. Therefore, the data steward repository 710 of MDM_T_A node 704 is integrated to the group MDM's repository 708 (MDM_T_A, Parcel: John). Now consider MDM_T_B node 706; the link between this node 706 and the group MDM node 702 is an operational link. In this case, a check for conflict may be performed, e.g., as described in FIG. 6 at 610. In the example shown, there is a conflict of the data steward for "Citizen". Conflict resolution may be applied to resolve the final data steward for the group MDM node 702, and hence, "MDM_T_A, Parcel: John, MDM_T_B, Citizen: Dan, MDM_T_B, Parcel: Frank" shown as part of the data steward repository 708 of the group MDM node 702.

A reference link establishes data reference from a Registry Node A to another Node B. In this case, Node A may not make a change directly to the data in Node B, but only make a reference to the data in Node B in order to retrieve the data from Node B and hold the master data holistic view in Node A. Thus, no conflicts in the data stewardship exist, and therefore, in one embodiment of the present disclosure no conflict check is performed if it is determined that a link between two nodes is a reference link (e.g., 606). Operational link, on the other hand, is established from Transaction Node to Transaction/Coexistence Node, and therefore, it is possible to have conflict in data stewardship.

Figure 8:
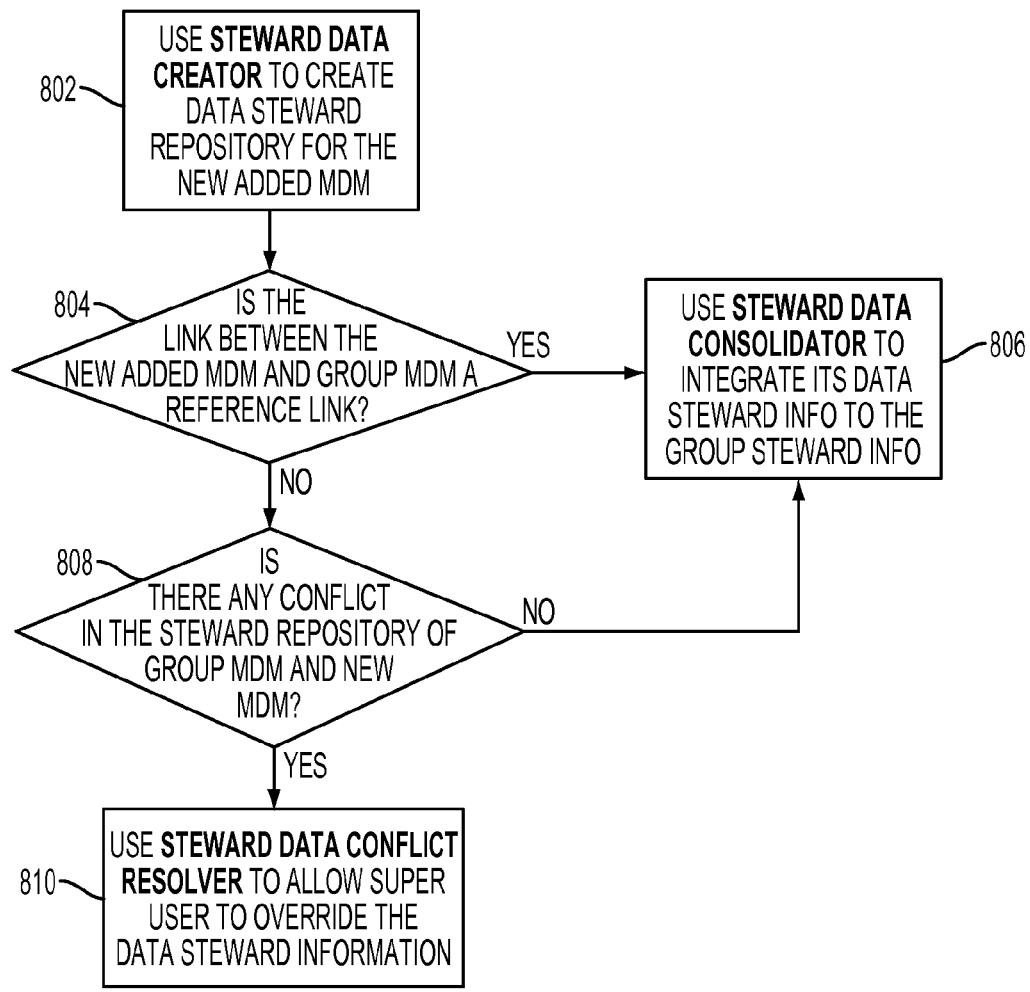
FIG. 8 is a flow diagram illustrating a method of updating a data steward repository in response to a new MDM node being added to a MDM node network in one embodiment of the present disclosure.

FIG. 8 is a flow diagram illustrating a method of updating a data steward repository in response to a new MDM node being added to a MDM node network in one embodiment of the present disclosure. At 802, steward data creator of the new MDM node creates data steward repository for the new added MDM node. For instance, the data objects to their data steward relationships are established or determined and stored in a repository, for instance, as a data file, database table or in any other form. At 804, it is determined whether the link between the new added MDM node and a group MDM node of the group into which the new MDM node is being added is a reference link. At 806, if the link is a reference link, steward data consolidator integrates its data steward information to the group steward information. For instance, the data steward repository of the group MDM node is updated to include the data steward information of the new MDM node. At 808, if the link is not a reference link, it is determined whether any conflict exists in the steward repository of the group MDM node and that of the new MDM node. At 810, if there are conflicts, steward data conflict resolver may override the data steward information.

Figure 9:
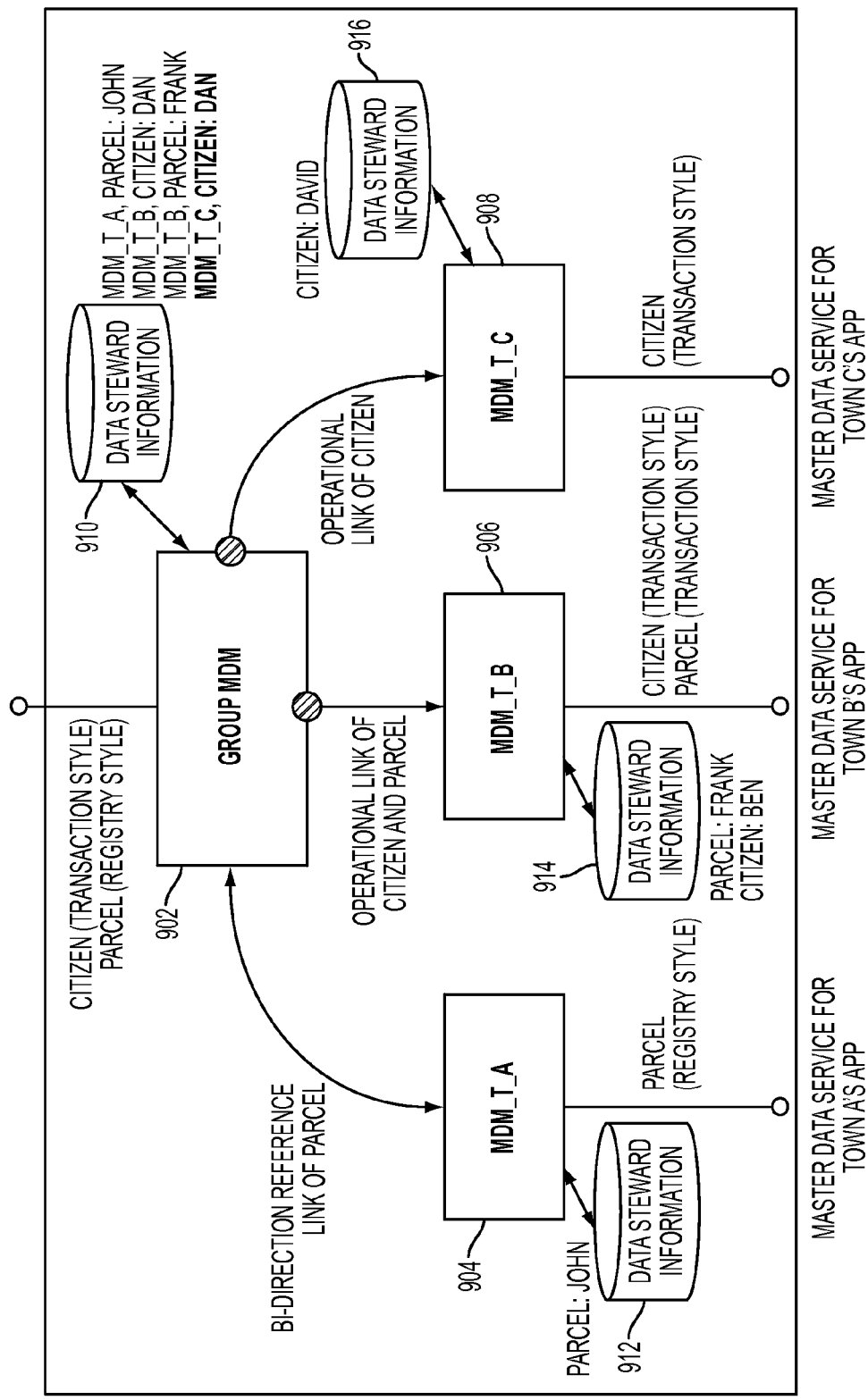
FIG. 9 is a system diagram illustrating components that update a data steward repository in response to a new MDM node being added to a MDM node network in one embodiment of the present disclosure.

FIG. 9 is a system diagram illustrating components that update a data steward repository in response to a new MDM node being added to a MDM node network in one embodiment of the present disclosure. The new MDM node 908 with its data steward repository containing data steward information 916 is added to the MDM node network, which may include a group MDM node 902 with its data steward repository 910, and existing MDM nodes 904, 906 with their respective data steward repositories 912, 914. The group MDM node's repository 910 includes the data steward information associated with the existing MDM nodes 904, 906. FIG. 9 shows adding of a MDM node (908) to an MDM network which may include a group MDM node 902 and its data steward repository 910, an MDM node 904 with its data steward repository 912 linked to the group MDM node 902 by a bi-direction reference link, and another MDM node 908 with its data steward repository 916. A data steward repository 916 for MDM_T_C node 908 is created. The type of link between MDM_T_C 916 and the group MDM 902 is checked. Since it is an operational link, a conflict check is performed. In this case, the data steward for MDM_T_C 908 for "Citizen" is "David", but it is "Dan" in Group MDM's data steward repository 910, and hence a conflict resolver may be applied to resolve the conflict.

Figure 10:
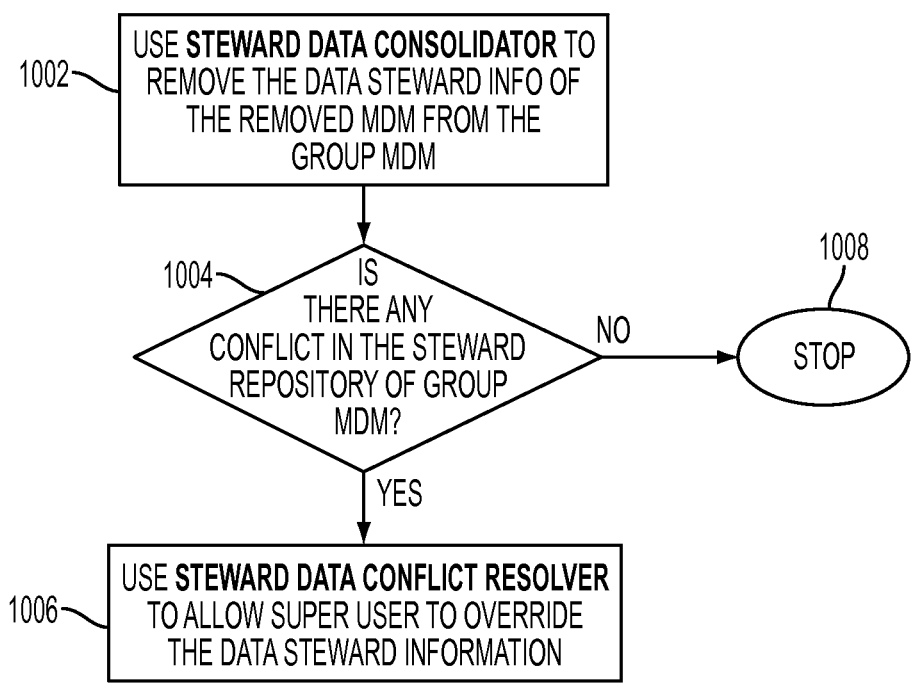
FIG. 10 is a flow diagram illustrating a method of updating a data steward repository in response to a MDM node being removed from a MDM node network in one embodiment of the present disclosure.

FIG. 10 is a flow diagram illustrating a method of updating a data steward repository in response to a MDM node being removed from a MDM node network in one embodiment of the present disclosure. At 1002, steward data consolidator may remove the data steward information associated with the MDM node being removed from the group MDM node's data steward repository. At 1004, it is determined whether there are any conflicts in the steward repository of group MDM. At 1006, if conflict is detected, steward data conflict resolver may be used to override the data steward information. Otherwise, the process stops to returns to its caller at 1008.

Figure 11:
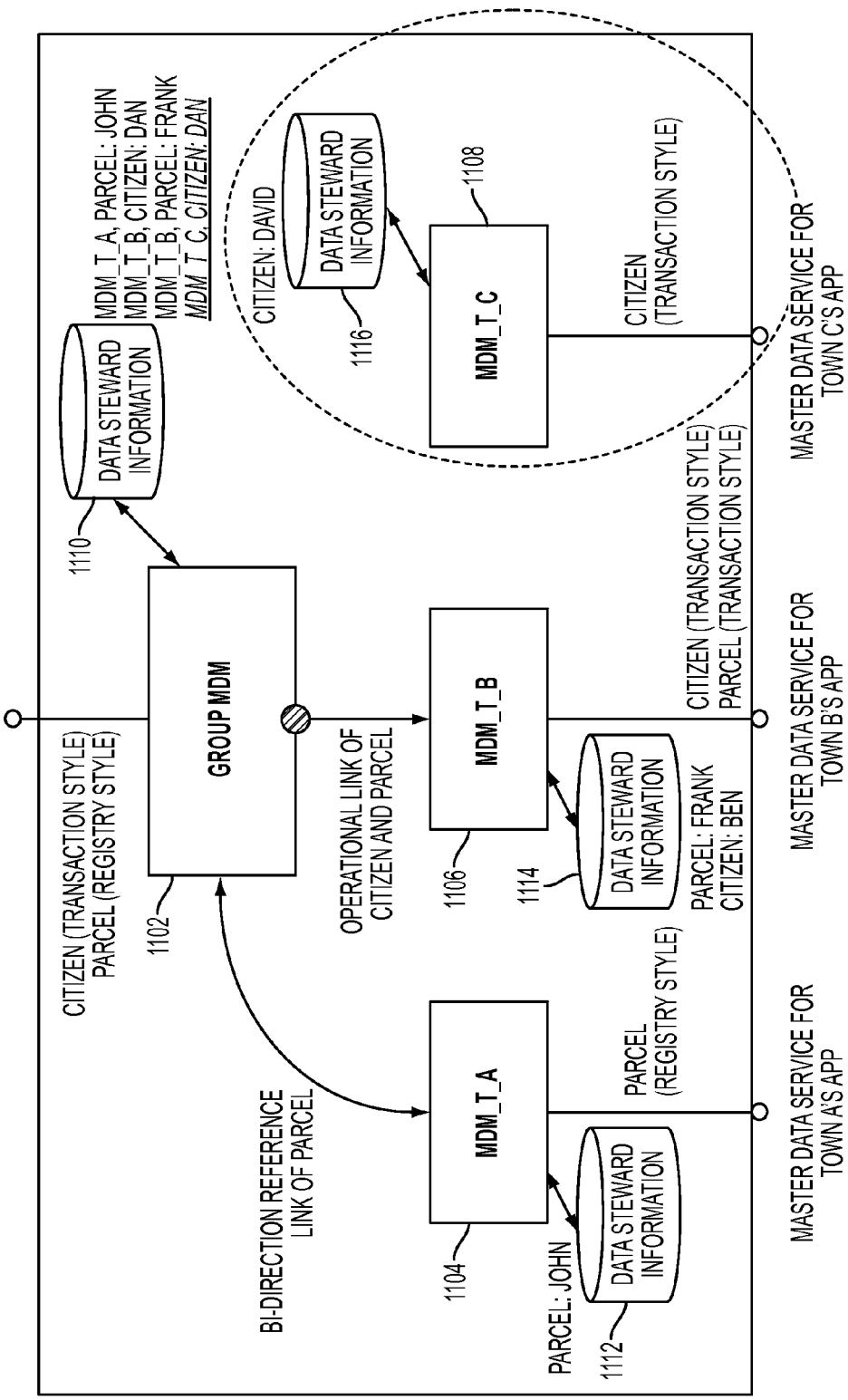
FIG. 11 is a system diagram illustrating components that update a data steward repository in response to a MDM node being removed from a MDM node network in one embodiment of the present disclosure.

FIG. 11 is a system diagram illustrating components that update a data steward repository in response to a MDM node being removed from a MDM node network in one embodiment of the present disclosure. The data steward information stored in the repository 1116 of the MDM node 1108 being removed (or disconnected) from the network is deleted from the repository 1110 of the group MDM node 1102. The data steward information about the remaining MDM nodes 1104, 1106 stored their respective repositories 1112, 1114 is left unchanged in the repository 1110 of the group MDM node 1102. FIG. 11 shows an example of updating a data steward repository when removing a node from the MDM network. The MDM_T_C node 1108, for example, may be removed by applying step 1002 of FIG. 10. The resulting data steward repository 1110 for Group MDM node 1102 after the removing process, is "MDM_T_A, Parcel: John, MDM_T_B, Citizen: Dan, MDM_T_B, Parcel: Frank".

Figure 12:
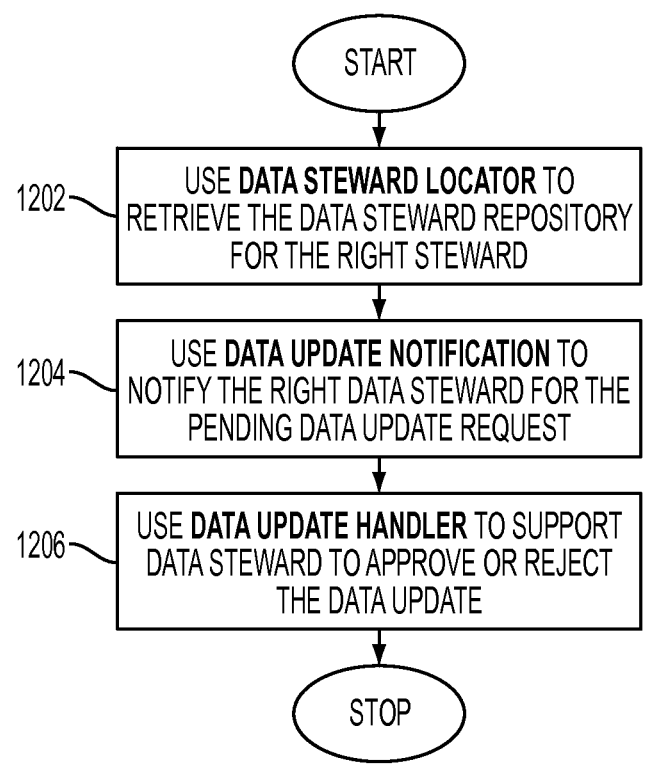
FIG. 12 is a flow diagram illustrating a method of performing data stewardship functionalities in one embodiment of the present disclosure.

FIG. 12 is a flow diagram illustrating a method of performing data stewardship functionalities in one embodiment of the present disclosure. The functionalities in one embodiment may be performed by a data stewardship facilitator residing in each of the Group MDM nodes. At 1202, data steward locator may retrieve information from the data steward repository to determine the data steward who is responsible for managing the data being considered in response to receiving data read or write requests from one or more MDM nodes that the group MDM node is managing. This process may include looking up or indexing a database table or the like. At 1204, data update notification functionality may notify the determined data steward for the pending data update request. At 1206, data update handler functionality may support a data steward to approve or reject the data update. Data updates may be received from MDM nodes that have write access or permission to modify the data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for managing data stewardship in a multi-level master data management system, comprising:
   steward data composer including at least:
   steward data creator operable to create a data steward repository for a master data management system to define relationships between data stewards and data objects for which data stewards are responsible;
   steward data consolidator operable to create an integrated data steward repository by combining multiple data steward repositories; and
   steward data conflict resolver operable to support functionality that overrides data steward relationships; and
   data stewardship facilitator including at least:
   data steward locator operable to determine from the data steward repository the data steward responsible for a data object;
   data update notification module operable to notify the determined data steward of a pending data update; and
   data update handler operable to support data steward to approve or reject the data update,
   wherein the multi-level master data management system comprises a plurality of master data management systems and each of the plurality of master data management systems comprises the steward data composer and the data stewardship facilitator.

2. The system of claim 1, wherein the plurality of master data management systems includes a group master data management node and a plurality of participant master data management nodes.

3. The system of claim 2, wherein the steward data consolidator integrates the defined relationships of the participant master data management nodes to a data steward repository of the group master data management node.

4. The system of claim 2, wherein the plurality of master data management systems further includes a root master data management node comprising a plurality of group master data management nodes.

5. The system of claim 4, wherein the steward data consolidator integrates data in the data steward repository of the group master data management node to a data steward repository of the root master data management node.

6. The system of claim 1, wherein the steward data conflict resolver resolves conflict existing in the defined relationship between two master data management nodes that are linked by an operational link and in which at least one of the two master data management nodes is implemented in transaction style.

7. A method of managing data stewardship in multi-level master data management system, the multi-level master data management system including a plurality of participant master data management nodes and a group master data management node that manages the plurality of participant master data management nodes, comprising:
   creating a data steward repository for each of the participant master data management nodes to define relationships between data stewards and data objects for which data stewards are responsible;
   determining a data access link type between each of the participant master data management nodes and the group master data management node;
   integrating data steward information of a participant master data management node of the plurality of participant master data management nodes to a data steward repository of the group master data management node, in response to determining that data access link type between the participant master data management node and the group master data management node is a reference link; and in response to determining that a data access link type between the participant master data management node and the group master data management node is an operational link, performing a conflict check and resolution for existing conflict before integrating data steward information of the participant master data management node to the group master data management node, wherein the multi-level master data management system comprises a plurality of group master data management nodes, each managing a plurality of participant master data management nodes, and wherein the method further comprises creating a data steward repository of a root master data management node that manages the plurality of the group master data management nodes by integrating data steward information of the plurality of the group master data management nodes to the data steward repository of the root master data management node.

8. The method of claim 7, wherein in response to receiving a request for update of data, the group master data management node searches and identifies from the group master data management node's data steward repository, a data steward responsible for the data.

9. The method of claim 8, wherein the group master data management node sends a notification to the identified data steward.

10. The method of claim 8, wherein a user interface is provided to the identified data steward to support the identified data steward in updating of the data.

11. The method of claim 7, further including:
in response to a request to disconnect a participant master data management node from the multi-level master data management system, removing data steward information associated with the disconnecting master data management node from the group master data management node's data steward repository.

12. A computer readable storage medium storing a program of instructions executable by a machine to perform a method of managing data stewardship in multi-level master data management system, the multi-level master data management system including a plurality of participant master data management nodes and a group master data management node that manages the plurality of participant master data management nodes, comprising:

creating a data steward repository for each of the participant master data management nodes to define relationships between data stewards and data objects for which data stewards are responsible;

determining a data access link type between each of the participant master data management nodes and the group master data management node;

integrating data steward information of a participant master data management node of the plurality of participant master data management nodes to a data steward repository of the group master data management node, in response to determining that data access link type between the participant master data management node and the group master data management node is a reference link; and in response to determining that a data access link type between the participant master data management node and the group master data management node is an operational link, performing a conflict check and resolution for existing conflict before integrating data steward information of the participant master data management node to the group master data management node, wherein the multi-level master data management system comprises a plurality of group master data management nodes, each managing a plurality of participant master data management nodes, and wherein the method further comprises creating a data steward repository of a root master data management node that manages the plurality of the group master data management nodes by integrating data steward information of the plurality of the group master data management nodes to the data steward repository of the root master data management node.

13. The computer readable storage medium of claim 12, wherein in response to receiving a request for update of data, the group master data management node searches and identifies from the group master data management node's data steward repository, a data steward responsible for the data.

14. The computer readable storage medium of claim 13, wherein the group master data management node sends a notification to the identified data steward.

15. The computer readable storage medium of claim 13, wherein a user interface is provided to the identified data steward to support the identified data steward in updating of the data.

16. The computer readable storage medium of claim 12, further including:
in response to a request to disconnect a participant master data management node from the multi-level master data management system, removing data steward information associated with the disconnecting master data management node from the group master data management node's data steward repository.

* * * * *